(12) United States Patent
Morico et al.

(10) Patent No.: US 8,154,891 B1
(45) Date of Patent: Apr. 10, 2012

(54) METHODS AND APPARATUS FOR SELECTABLE OUTPUT DC/DC CONVERTER

(75) Inventors: Peter Dennis Morico, North Grafton, MA (US); John D. Walker, Bolton, MA (US)

(73) Assignee: Raytheon Company, Waltham, MA (US)

( * ) Notice: Subject to any disclaimer, the term of this patent is extended or adjusted under 35 U.S.C. 154(b) by 516 days.

(21) Appl. No.: 12/467,540

(22) Filed: May 18, 2009

Related U.S. Application Data

(60) Provisional application No. 61/054,254, filed on May 19, 2008.

(51) Int. Cl.
*H02M 3/18* (2006.01)

(52) U.S. Cl. .......................................... 363/61; 307/110

(58) Field of Classification Search .................. 307/110; 323/247, 250, 361; 363/59–62, 65, 66
See application file for complete search history.

(56) References Cited

U.S. PATENT DOCUMENTS

| | | | |
|---|---|---|---|
| 4,318,166 A * | 3/1982 | Bloom | 363/26 |
| 5,272,313 A * | 12/1993 | Karino et al. | 219/130.21 |
| 6,038,154 A | 3/2000 | Boylan et al. | |
| 6,114,817 A | 9/2000 | Fernsler | |
| 6,790,285 B2 * | 9/2004 | Matsumoto | 118/707 |
| 2004/0057258 A1 * | 3/2004 | Dobrowolski | 363/59 |
| 2006/0131960 A1 * | 6/2006 | Aritsuka | 307/17 |

* cited by examiner

*Primary Examiner* — Jue Zhang
*Assistant Examiner* — Gary Nash
(74) *Attorney, Agent, or Firm* — Daly, Crowley, Mofford & Durkee, LLP

(57) ABSTRACT

Methods and apparatus for providing a DC/DC converter having a first configuration to output a first voltage level and a second configuration to output a second voltage level.

17 Claims, 9 Drawing Sheets

METHODS AND APPARATUS FOR SELECTABLE OUTPUT DC/DC CONVERTER

CROSS REFERENCE TO RELATED APPLICATIONS

The present application claims the benefit of U.S. Provisional Patent Application No. 61/054,254, filed on May 19, 2008, which is incorporated herein by reference.

STATEMENT REGARDING FEDERALLY SPONSORED RESEARCH

This invention was made with Government support under Contract No. H94003-04-D-0006 awarded by the Department of Defense. The Government has certain rights in this invention.

BACKGROUND

As is known in the art, DC/DC converters convert an input direct current (DC) signal at a first voltage to an output direct current signal at a second voltage. One type of DC/DC converter is referred to a switched-mode converter in which a DC voltage is applied across an inductor or transformer in a manner to generate current flow for storing energy in components, such as capacitors. The output voltage is regulated by controlling the switching elements.

In order to maximize volumetric power density, DC/DC converters are typically targeted to a specific voltage output level. Thus, for each voltage level required, a particular DC/DC converter is required. For example, if there is a need for a DC/DC converter having a voltage output of X volts, and there is a later need for a DC/DC converter having a voltage output of 2X volts, the 2X converter is created using the X converter as a design baseline. The time and cost to design the new 2X output is significant even with the knowledge of the X volt design. It will be readily appreciated that the inflexible nature of conventional converter circuits is disadvantageous.

SUMMARY

The present invention provides a dual output DC/DC converter having an integrated magnetic core providing first and second independent transformers and first and second energy storage inductors With this arrangement, a converter outputs a first voltage level in a first configuration and a second voltage level in a second configuration. In an exemplary embodiment, first and second electrical connections are made, such as by jumpers, to select the second voltage level. While exemplary embodiments of the invention are shown and described in conjunction with certain implementations, components, voltage levels, and voltage level overlaps, it will be readily apparent that other embodiments can be provided to meet the needs of a particular application without departing from the present invention.

In one aspect of the invention, a DC/DC converter comprises an integrated magnetic core having first and second gapped legs and first and second ungapped legs to provide independent first and second transformers and first and second energy storage inductors, the first transformer including a primary winding and first and second secondary windings, the second transformer including a primary winding and first and second secondary windings, wherein the converter provides a first voltage level in a first configuration and provides a second voltage level in a second configuration.

The converter can further include one or more of the following features: a first circuit includes the second secondary winding of the first transformer and the first secondary winding of the second transformer and a second circuit includes the first secondary winding of the first transformer and the second secondary winding of the second transformer, the first circuit includes first and second diodes coupled cathode-to-cathode at a connection point and a first capacitor having a first end coupled to a point between the second secondary winding of the first transformer and the first secondary winding of the second transformer and a second end coupled to the connection point, wherein the connection point is provided in the first configuration and not the second configuration, the second circuit includes third and fourth diodes coupled cathode-to-cathode at a Vout+ terminal and a second capacitor having a first end coupled to a point between the first secondary winding of the first transformer and the second secondary winding of the second transformer and a second end coupled to the connection point, wherein a Vout– terminal is provided by the first end of the first capacitor, the first and second configurations differ by first and second connections added and the connection point connecting the first and second capacitors removed, the first connection connects the Vout+ terminal and the connection point, the second connection connects the Vout– terminal with the second end of the second capacitor, a ratio of the first voltage level to the second voltage level is two, and the first voltage level ranges from about 42V to about 56V and the second voltage level ranges from about 21V to about 28V.

In another aspect of the invention, a method comprises providing an integrated magnetic core having first and second gapped legs and first and second ungapped legs to provide independent first and second transformers and first and second energy storage inductors, providing the first transformer with a primary winding and first and second secondary windings, and providing the second transformer with a primary winding and first and second secondary windings, wherein the converter provides a first voltage level in a first configuration and provides a second voltage level in a second configuration.

The method can further include one or more of the following features: a first circuit includes the second secondary winding of the first transformer and the first secondary winding of the second transformer and a second circuit includes the first secondary winding of the first transformer and the second secondary winding of the second transformer, the first circuit includes first and second diodes coupled cathode-to-cathode at a connection point and a first capacitor having a first end coupled to a point between the second secondary winding of the first transformer and the first secondary winding of the second transformer and a second end coupled to the connection point, wherein the connection point is provided in the first configuration and not the second configuration, the second circuit includes third and fourth diodes coupled cathode-to-cathode at a Vout+ terminal and a second capacitor having a first end coupled to a point between the first secondary winding of the first transformer and the second secondary winding of the second transformer and a second end coupled to the connection point, wherein a Vout– terminal is provided by the first end of the first capacitor, the first and second configurations differ by first and second connections added and the connection point connecting the first and second capacitors removed, the first connection connects the Vout+ terminal and the connection point, and the second connection connects the Vout– terminal with the second end of the second capacitor.

In a further aspect of the invention, a DC/DC converter comprises a first primary winding having first and second secondary windings and a second primary winding having first and second secondary windings, a first circuit having a first circuit outer circuit loop including a first secondary winding of the second primary winding, a first diode, a second diode, and a second secondary winding of the first primary winding, a first circuit first inner circuit loop including a first capacitor, the second secondary winding of the first primary winding, and the first diode, a first circuit second inner loop including the first capacitor, the first secondary winding of the second primary winding, and the second diode, a second circuit coupled to the first circuit, the second circuit having a second circuit outer circuit loop including a first secondary winding of the first primary winding, a third diode, a fourth diode, and a second secondary winding of the second primary winding, a second circuit first inner circuit loop including a second capacitor, the first secondary winding of the first primary winding, and the third diode, a second circuit second inner loop including the second capacitor, the second secondary winding of the second primary winding, and the fourth diode, a Vout+ terminal located between the third and fourth diodes, a Vout− terminal located between the secondary winding of the first primary winding and the first secondary winding of the second primary winding, wherein the circuit includes a first configuration to provide a first output voltage level and a second configuration to provide a second output voltage level, the first configuration including a first configuration electrical connection to couple the first and second capacitors end-to-end from the Vout+ terminal to the Vout− terminal, the second configuration including: a first electrical connection for the second configuration from the Vout+ terminal to a point between the first and second diodes, a second electrical connection for the second configuration from the Vout− terminal to a node coupled to the second capacitor, the first secondary winding of the first primary winding, and the second secondary winding of the second primary winding, wherein the first configuration electrical connection is removed.

In another aspect of the invention, a DC/DC converter, comprises substantially similar first and second transformers including an integrated magnetic core having first and second gapped legs and first and second ungapped legs to provide independent first and second transformers and first and second energy storage inductors, the first transformer including first and second primary windings and first and second secondary windings with a first primary/secondary winding pair and second primary/secondary winding pair, and the second transformer including first and second primary windings and first and second secondary windings with a first primary/ secondary winding pair and a second primary/secondary winding pair, wherein the converter provides a first voltage level in a first configuration having the first and second secondary windings of the first and second transformers coupled in parallel and provides a second voltage level substantially twice the first voltage level in a second configuration having the first and second secondary windings of the first and second transformers coupled in series.

In a further aspect of the invention, a method comprises providing first and second substantially similar transformers including an integrated magnetic core having first and second gapped legs and first and second ungapped legs to provide independent first and second transformers and first and second energy storage inductors, the first transformer including first and second primary winding/secondary winding pairs, the second transformer including first and second primary winding/secondary winding pairs, wherein the converter provides a first voltage level in a first configuration utilizing parallel-connected transformer secondary windings and provides a second voltage level substantially twice the value of the first voltage level, in a second configuration utilizing series connected transformer secondary windings.

BRIEF DESCRIPTION OF THE DRAWINGS

The foregoing features of this invention, as well as the invention itself, may be more fully understood from the following description of the drawings in which.

DETAILED DESCRIPTION

Figure 1A:
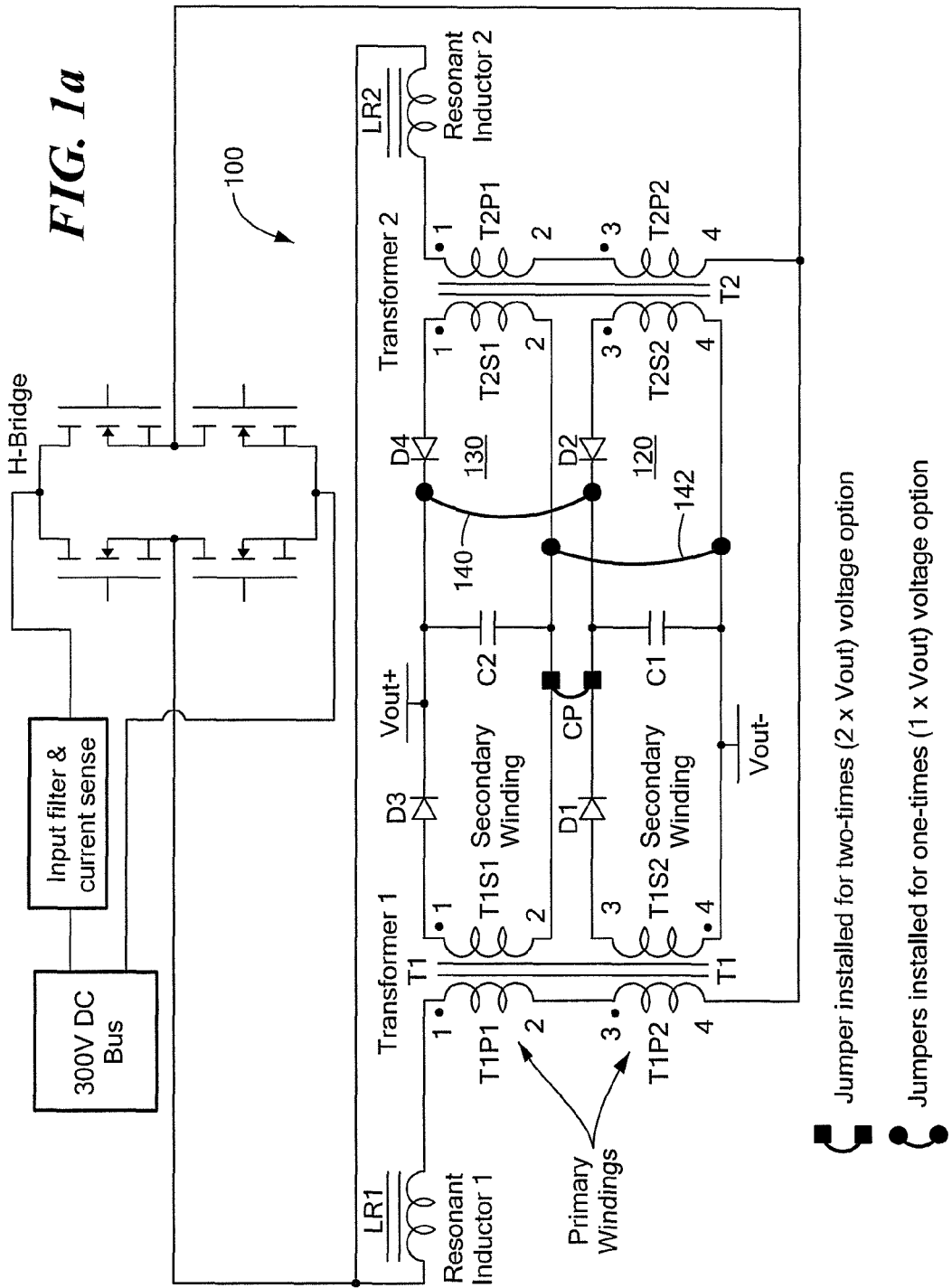
FIG. 1A is a schematic representation of an exemplary integrated magnetic dual output DC/DC converter in a first configuration in accordance with exemplary embodiments of the invention.
Figure 1B:
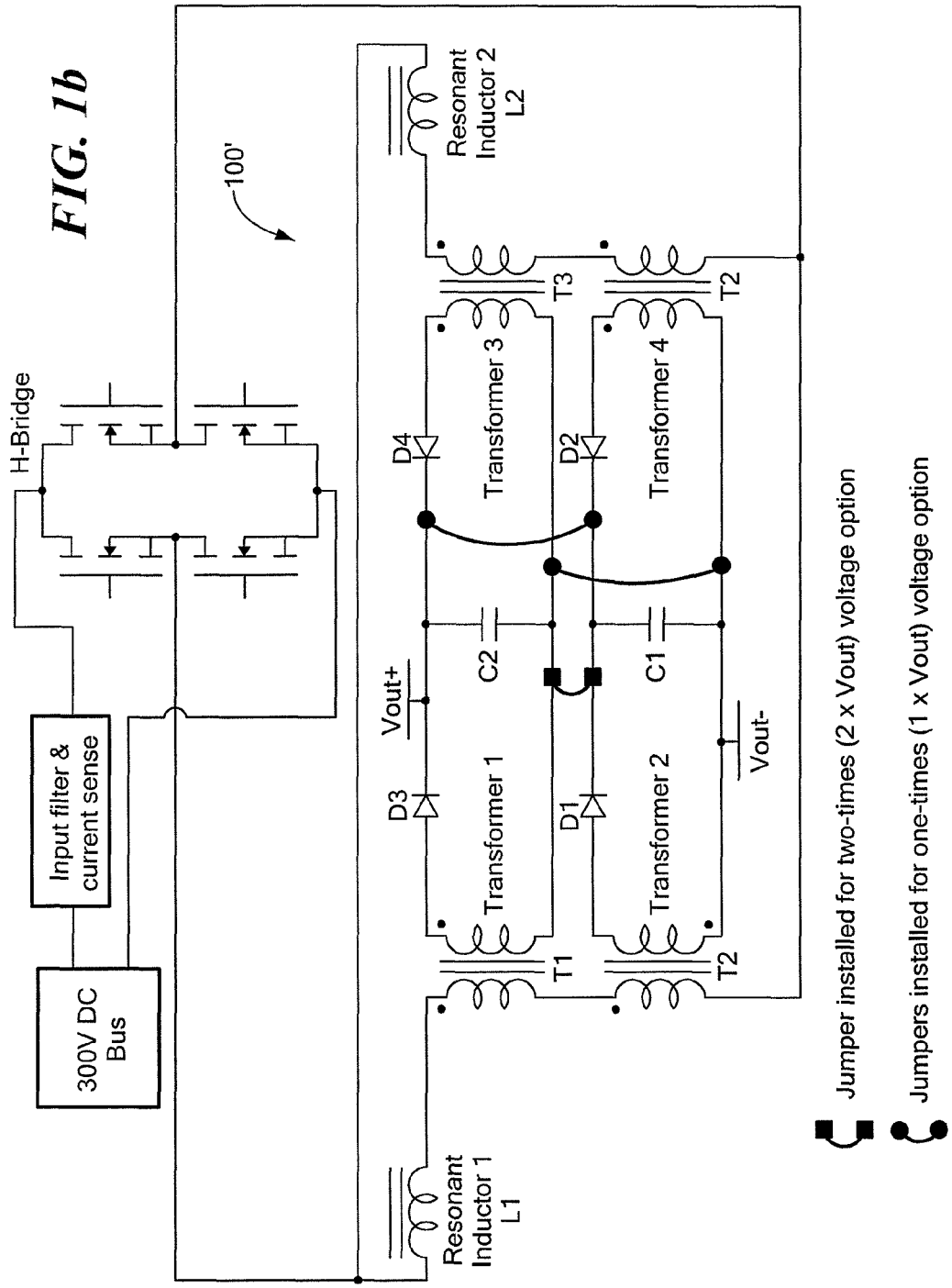
FIG. 1B schematic representation of an exemplary separate conventional magnetic dual output DC/DC converter in a first configuration in accordance with exemplary embodiments of the invention.

FIG. 1A shows a circuit for an implementation of a dual output DC/DC converter 100 in accordance with exemplary embodiments of the invention. The converter 100 has dual output voltage levels such that with the modification of electrical connections, such as one or two jumpers, the output can be changed from a first voltage output level to a second voltage output level. The converter 100 of FIGS. 1A and 1B provides the first output voltage level, e.g., 56V, which is greater than the second voltage level, e.g. 28V, discussed below.

The converter 100 includes a first integrated transformer T1 and energy storage inductor having two primary windings T1P1 (1-2), T1P2 (3-4) and two secondary windings T1S1 (1-2), T1S2 (3-4) and a second integrated transformer T2, and energy storage inductor which can be substantially identical to the first integrated transformer T1 and energy storage inductor. Similar to the first transformer T1, the second transformer T2 includes first and second primary windings T2P1, T2P2, and secondary windings T2S1, T2S2.

Figure 2:
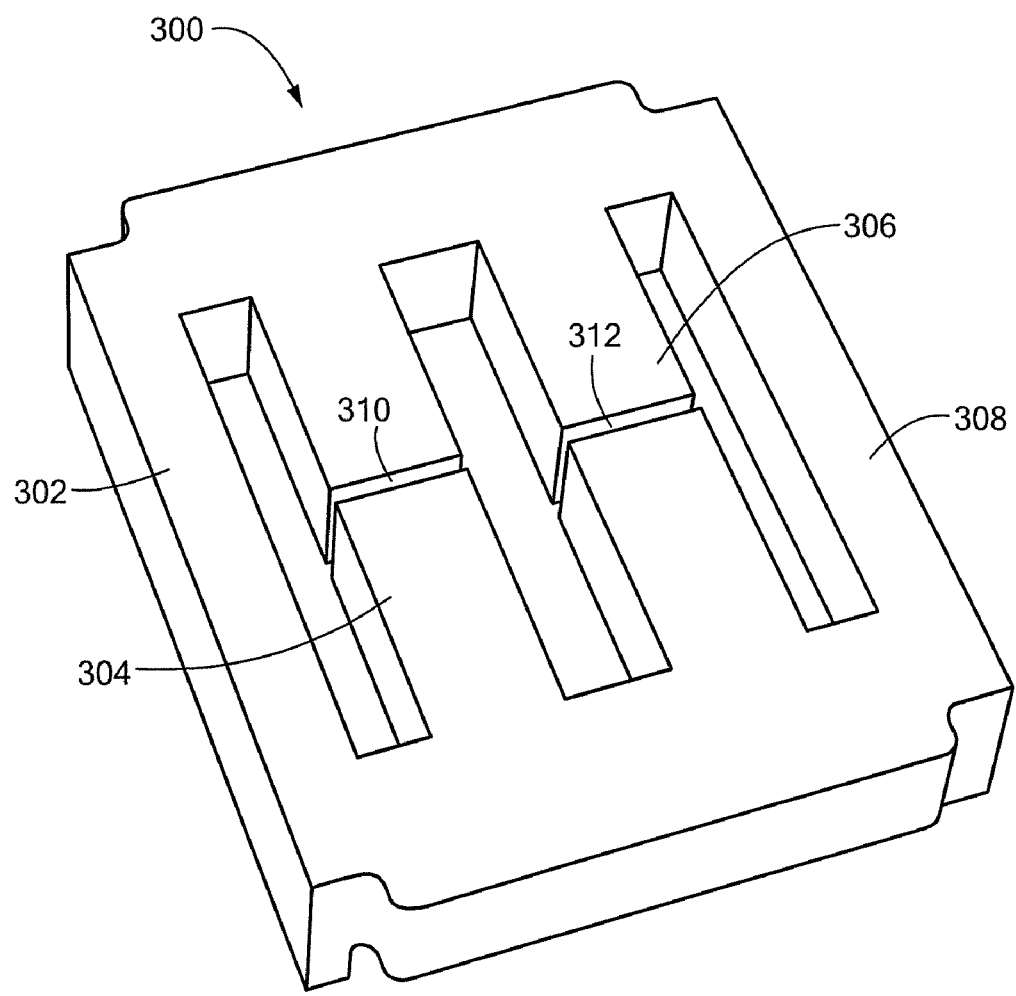
FIG. 2 is a pictorial representation of an integrated magnetic core integrating transformer 1 as shown in FIG. 1A, and energy storage inductors.
Figure 3:
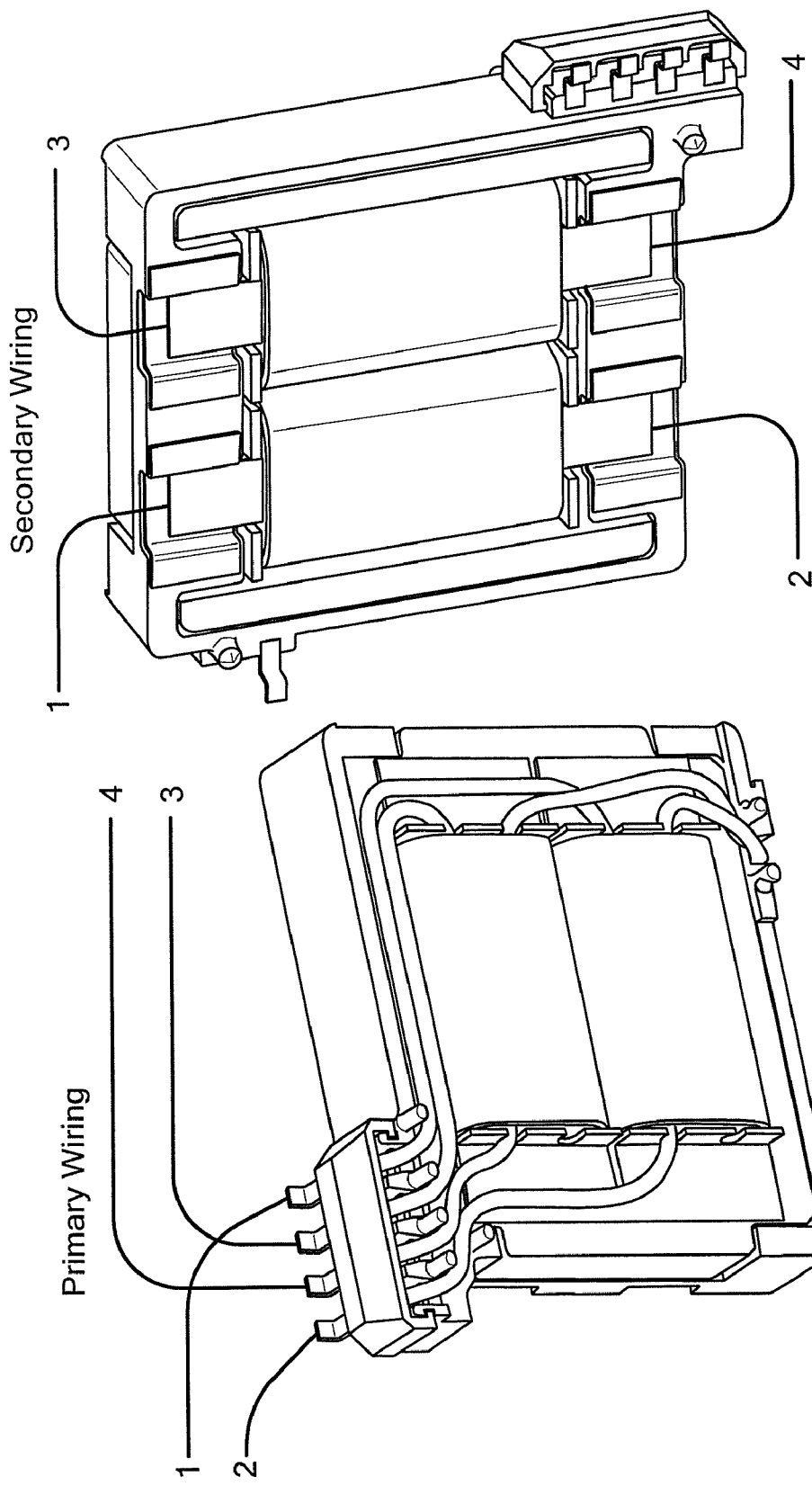
FIG. 3 is a pictorial representation of the complete coil and core integrated magnetic Transformer 1 as shown in FIG. 1A.

In one embodiment, the first and second transformers T1, T2 are integrated into a single magnetic core, as shown and described below in conjunction with FIGS. 2 and 3 showing one of the two main power transformers to facilitate understanding of the invention.

In the illustrated embodiment of FIG. 1A, the converter 100 includes a circuit 120 including the second secondary windings T1S2, T2S2 of the first and second transformers T1, T2 and first and second diodes D1, D2 coupled cathode to cathode. The first diode D1 has an anode coupled to the second secondary winding T1S2 (3-4) and the second diode D2 has an anode coupled to the second secondary winding T2S2 (3-4). A first capacitor C1 has a first terminal coupled to a point between the first and second diodes D1, D2 and a second terminal coupled to Vout−.

A second circuit 130 is coupled to the first circuit 120 via a connection point CP in the first configuration outputting the first voltage output level. The second circuit 130 mirrors the first circuit 120. The second circuit includes the first secondary windings T1S1 (1-2), T2S1 (1-2) of the first and second transformers T1, T2 and third and fourth diodes D3, D4 coupled cathode to cathode. The Vout+ terminal is between the third and fourth diodes D3, D4. The first and second circuits 120, 130 are connected at a point CP between the first and second diodes D1, D2, and a point between the secondary windings T1S1 (1-2) and T2S2 (3-4) of the second circuit 130. The first and second capacitors C1, C2 are coupled end-to-end from the Vout+ terminal to the Vout− terminal. The connection point CP is between the first and second capacitors C1, C2.

The Vout and twice Vout selectable output voltage level is additionally made possible by virtue of the synthetic output resistance afforded by the first and second resonant inductors LR1, LR2. This allows for direct parallel connection of two voltage sources while maintaining load sharing, being the rectified output voltage from the secondary windings of the first and second transformers T1, T2.

The resonant inductors LR1, LR2 are connected in series with the respective primary windings of the first and second transformers T1, T2. In an exemplary embodiment, the resonant inductors LR1, LR2 and primary windings are energized via an H-bridge of switching elements Q1, Q2, Q3, Q4 coupled to a 300V DC bus 150 via an input filter 152. H-bridge configurations, and other topologies are well known to one of ordinary skill in the art.

The converter 100' in FIG. 1B implements the functionally of the converter in FIG. 1A by using non-integrated transformers. The first transformer T1 of FIG. 1A is replaced by Transformers 1 and 2 in FIG. 1B and the second transformer T2 of FIG. 1A is replaced by Transformers 3 and 4 in FIG. 1B.

FIGS. 1A and 1B shows the selectable output voltage feature using jumper wires including the connections to alter the circuit configuration and provide the desired second voltage level output, e.g., 28V. The first electrical connection 140 connects Vout+ to the second diode D2 cathode. The second electrical connection 142 connects Vout− to a 'bottom' of the first capacitor C1. That is, the first and second capacitors C1, C2 each have one terminal coupled to Vout+ and the other terminal coupled to Vout−. In the second configuration, the connection point CP is not made. It can be seen that in the first configuration where the CP connection is made the secondary windings are coupled in series and in the second configuration where the first and second electrical connections 140, 142 are present the secondary windings are coupled in parallel.

In an exemplary embodiment, the converter 100 first and second output voltages can be selected. In one embodiment, such as the circuit of FIGS. 1A and 1B, the first voltage is 56V in the first configuration and the second voltage is 28V in the second configuration. It is understood that a wide range of selectable voltages can be provided to meet the needs of a particular application.

In one particular embodiment, the first range is from about 42V to about 56V and the second range is from about 21V to about 28V. In one embodiment, the first and second output voltage levels have a two-to-one ratio. In general, the particular output voltage levels are determined by duty cycles and turns ratios.

It should be noted that the voltage stress on the capacitors C1, C2 is the same at the 56V output level and at the 28V output level since only one-half (28V) of the output voltage is impressed across each of the first and second capacitors C1, C2. At the 28V output level, the total 28V output is impressed across the capacitors C1, C2. The current through the secondary windings S1, S2, is substantially constant for each voltage configuration.

It should be noted that the primary side of the converter requires no changes to realize the X to 2X voltage change. The primary current, voltage transformation ratio, and ZVS characteristics are independent of the secondary side output voltage selection.

It is understood that additional stages can be added as desired. For example, stages could be added to the circuit of FIGS. 1A and 1B to provide a 96V (48V+48V or 24+24+24+24) configuration. Note that the capacitors C1, C2 would still carry 24V each. Further stages could be added in parallel to the circuit of FIGS. 1A and 1B to provide additional current levels.

The inventive power conversion topology includes substantially similar integrated transformers T1, T2 shown in FIG. 1A. Similarly, FIG. 1B depicts substantially similar transformers T1, T2 connected in series and substantially similar transformers T3, T4 connected in series. Depending on the direction of the primary current flow, the energy storage transformers of both FIGS. 1A and 1B operate both as conventional power transfer devices or energy storage devices.

FIG. 2 shows a pair of transformers integrated into a single magnetic core 300 that can form a part of the invention, embodying Transformer 1 (and likewise Transformer 2) shown FIG. 1A. The core 300 includes first, second, third and fourth legs 302, 304, 306, 308. The second and third legs have respective gaps 310, 312. This arrangement allows 'magnetic integration' of two energy storage transformers. This allows energy to be stored half the time and energy to be transferred half the time while providing a very compact arrangement. FIG. 3 shows an exemplary configuration of an integrated transformer assembly of FIG. 1A, for example, with primary windings 1-2 and 3-4 and secondary windings 1-2 and 3-4.

Figure 4:
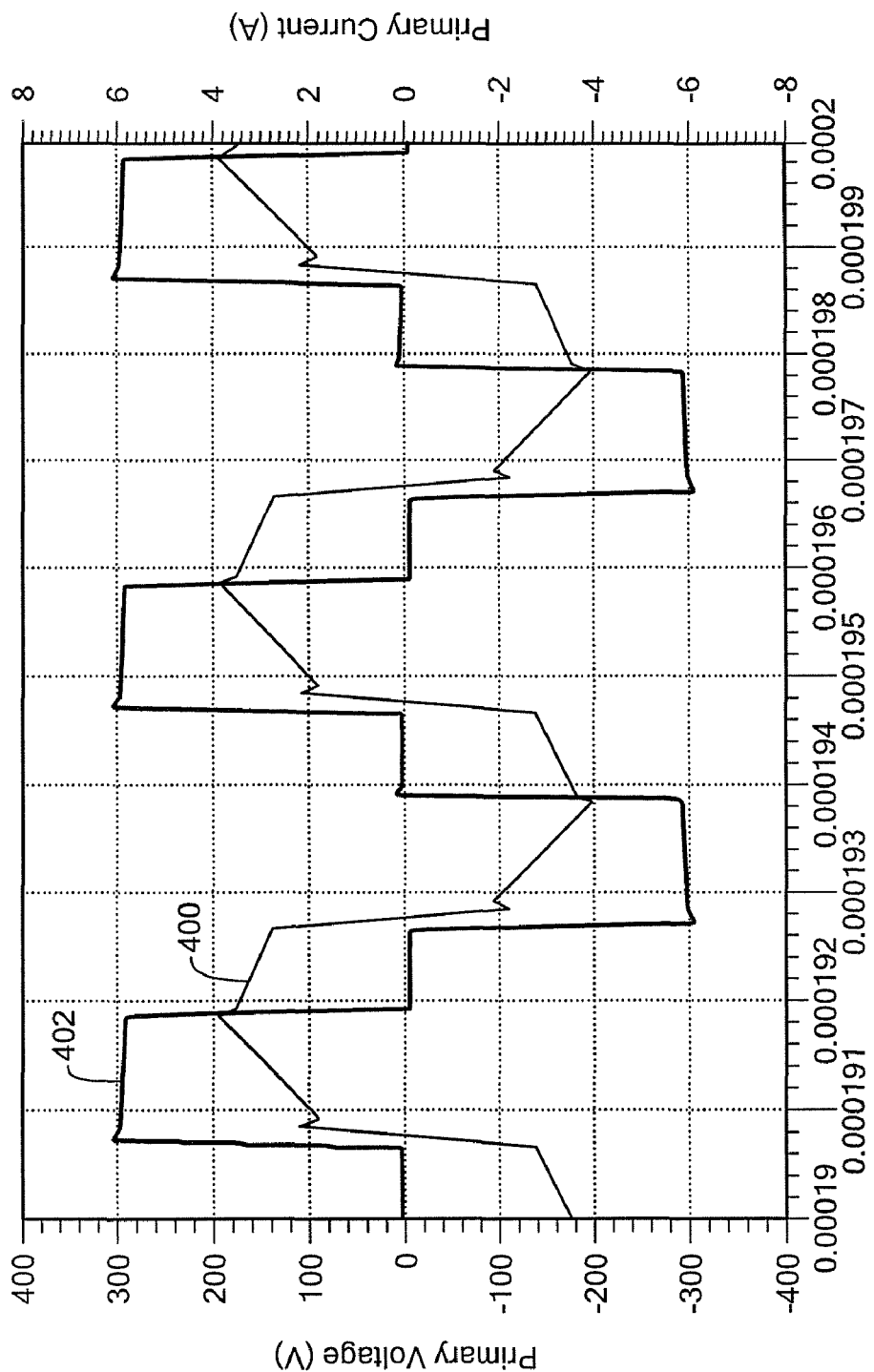
FIG. 4 is a graphical depiction of current and voltage at the output of the H-Bridge.

FIG. 4 shows a graphical representation of current 400 and voltage 402 at the primary of the power transformer in the core 300 (FIG. 2) at a nominal input voltage of 300 Vdc when delivering power to the secondary at a full load condition. As can be seen, Zero Voltage Switching is maintained under this full load condition, realizing a switch mode power stage exhibiting high efficiency energy conversion.

Figure 5:
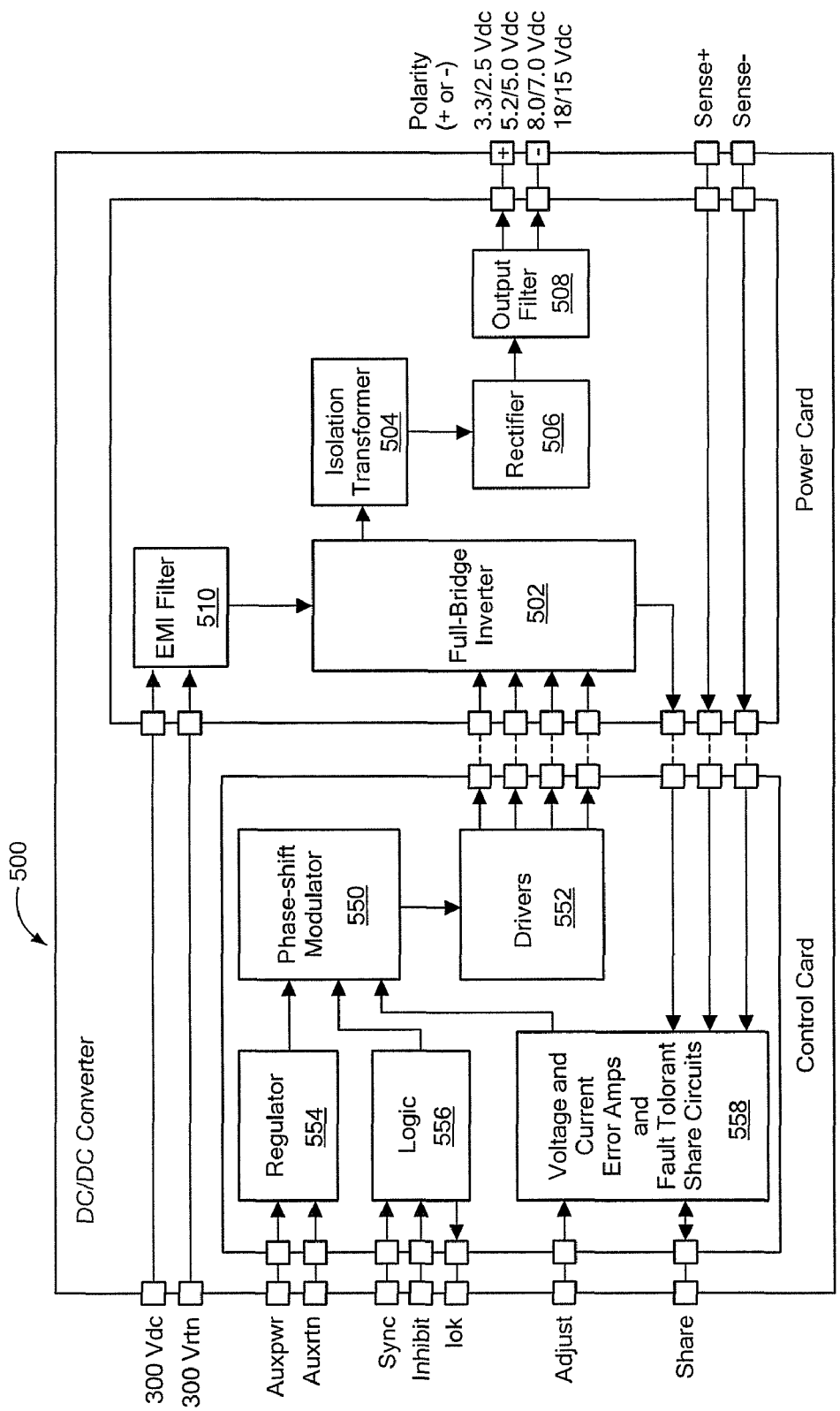
FIG. 5 is a block diagram of an exemplary DC/DC converter assembly in accordance with exemplary embodiments of the invention.

FIG. 5 is a block diagram of an exemplary DC/DC converter assembly 500 having a control card and a power card. A full bridge inverter 502 generates an output that is galvanically isolated by a transformer 504 and rectified by a rectifier 506. The rectifier 506 output is fed to an output filter 508.

An input voltage, e.g., 300V, is provided to the power card inputs for filtering by an EMI filter 510 before transmission to the inverter 502. A series of further modules on the control card provide desired functionality. A phase-shift modulator 550 provides information to a driver module 552 that controls switching elements in the inverter. A regulator module 554 energizes the phase-shift modulator 550 and a logic module 556 provides control information to the phase-shift modulator. A further module 558 provides voltage and current error functionality and fault tolerant operation with share circuits.

Figure 5A:
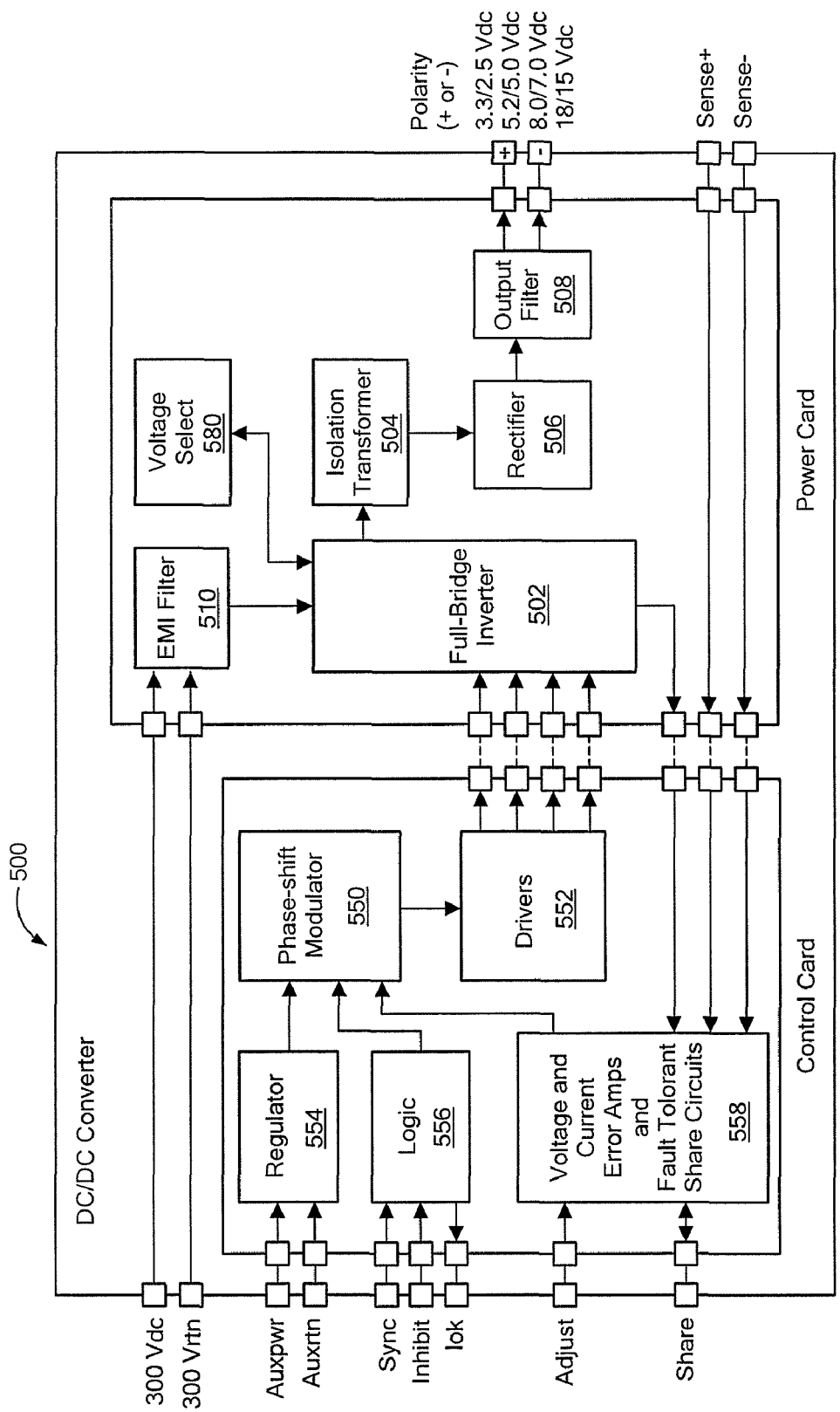
FIG. 5A is a block diagram of the DC/DC converter assembly of FIG. 5 with the addition of a output voltage selector module.

In one embodiment, first and second jumpers are manually installed to provide the desired voltage level. In other embodiments, a select module can provide connections to generate the desired voltage level. FIG. 5A shows an exemplary embodiment having a voltage select module 580 to enable a user to select voltage via a computer interface. That is, the voltage select module 580 provides electronic means utilizing transistors, relays, SCRs or other components to change the output voltage level to the desired amount.

Figure 6:
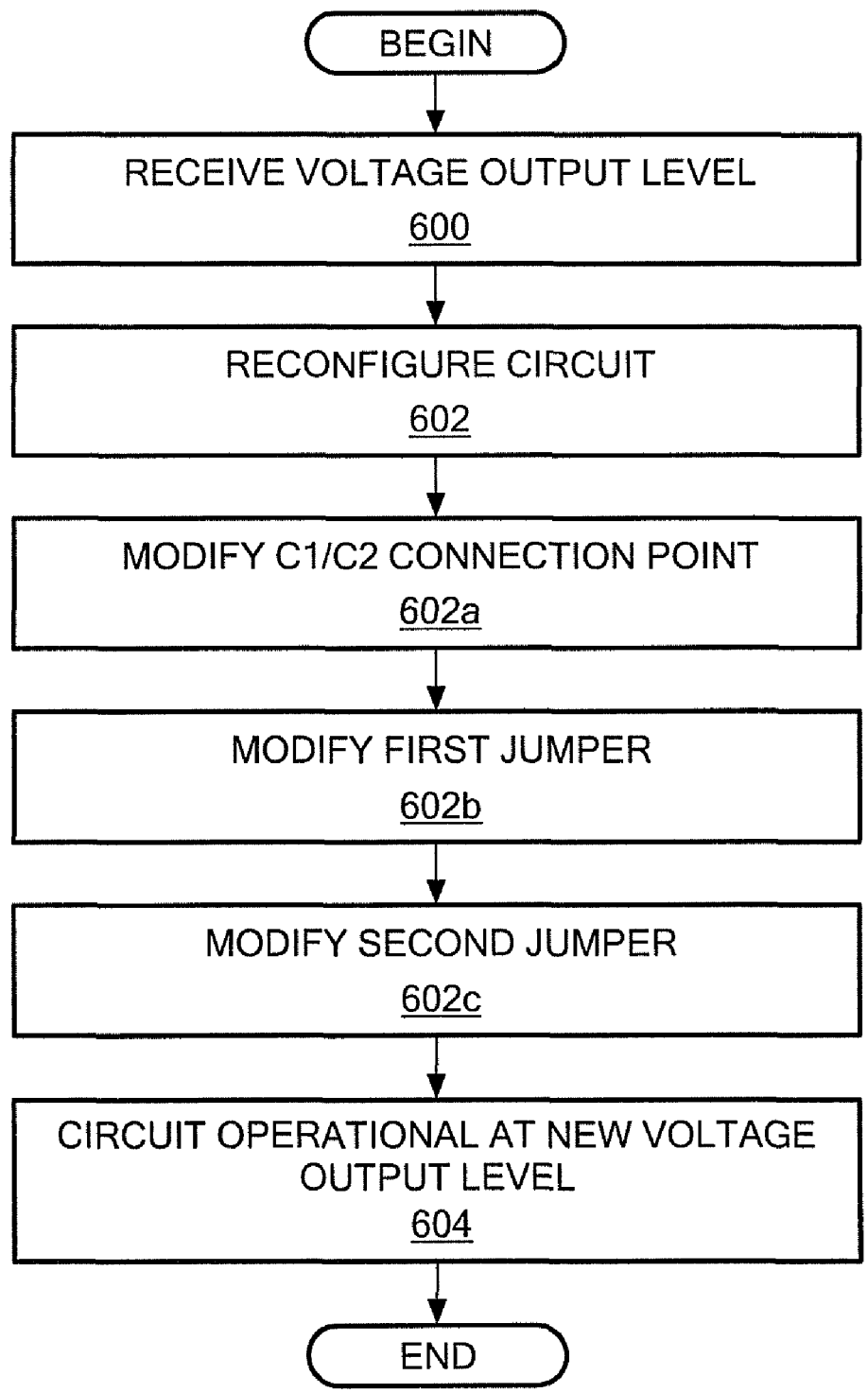
FIG. 6 is a flow diagram showing an exemplary sequence of steps for providing a DC/DC converter having selectable first and second output voltage levels.
Figure 7:
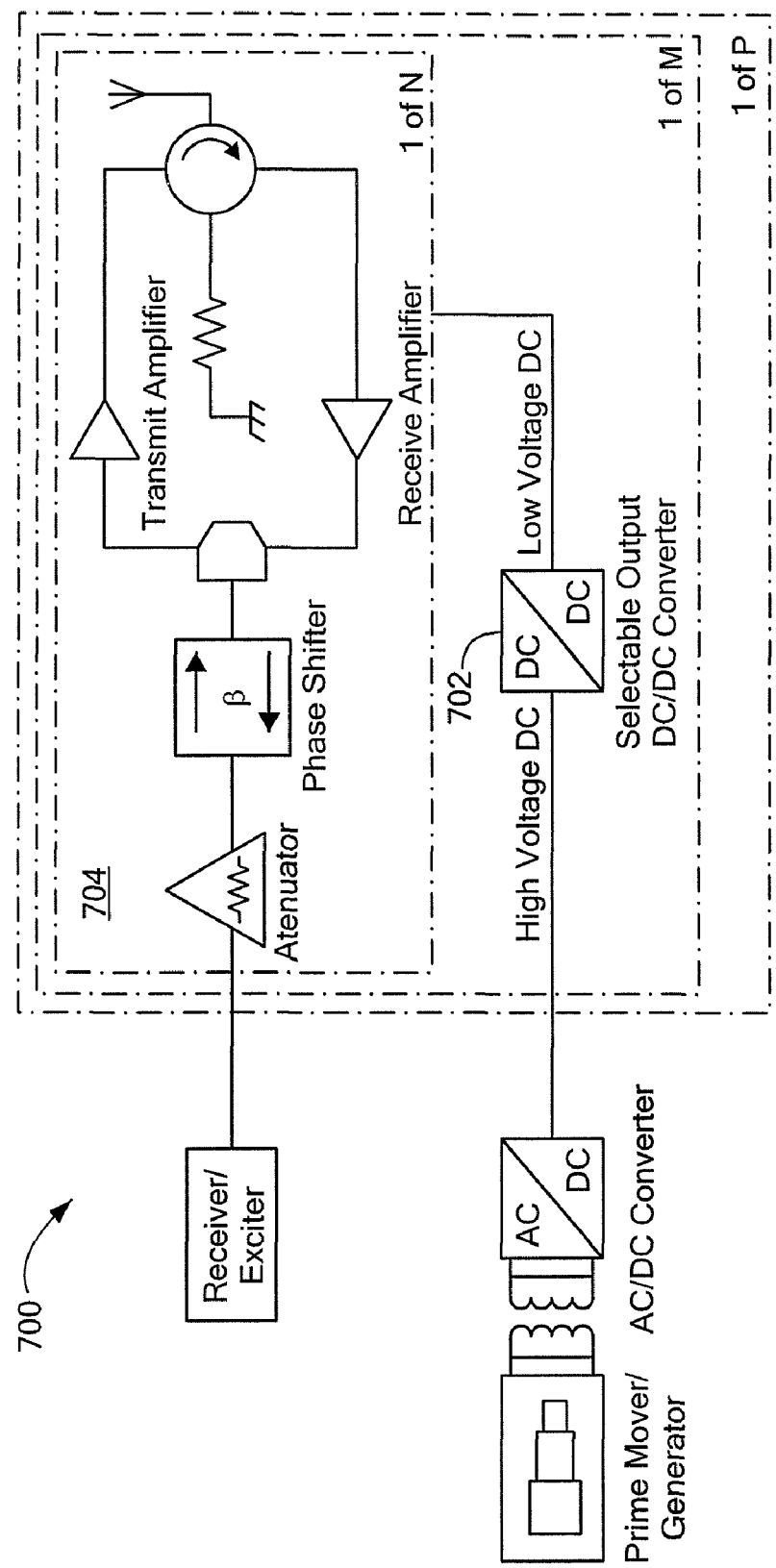
FIG. 7 is a schematic diagram of a phased array radar having a DC/DC converter with selectable output voltage levels.

FIG. 6 shows an exemplary sequence of steps to provide a dual output level DC/DC converter in accordance with exemplary embodiments of the invention. In step 600, a desired voltage output level is received. In step 602, the circuit is reconfigured for the desired voltage level. For example, the 56V configuration of FIGS. 1A and 1B may be reconfigured to the 28V configuration. In step 602*a*, a connection point CP between the first and second capacitors C1, C2 can be removed. A first jumper 140 can be added as shown in FIGS. 1A and 1B in step 602*b* and a second jumper 142 can be added in step 602*c*. It is understood that the jumpers can be added manually or electronically to meet the needs of a particular application. In step 604, the DC/DC converter can operate the new voltage output level.

It should be noted that the inventive embodiments enable output capacitor voltage rating to be sized for the lower voltage level. It will be appreciated that having a single capacitor that can be used for multiple output voltages is advantageous, especially in systems that employ significant numbers of these capacitors. Exemplary embodiments of the invention can be used in a wide variety of applications in which DC/DC converters are used.

It is understood that exemplary solid state phase array radar systems can use a dual output DC/DC converters in accordance with exemplary embodiments of the invention. As will be readily appreciated, large phased-array antennas use distributed power systems to deliver highly regulated low voltage DC power to thousands of transmit/receive (T/R) elements. Embodiments of the present invention collocated with the T/R elements provides local regulation at each element and eliminates the need to distribute low voltage at high current.

The present invention provides a selectable output zero voltage switching (ZVS) phase modulated current fed integrated magnetic DC/DC converter. With this arrangement, a desired voltage level can be selected while providing a compact design by virtue of an integrated core having dual independent energy storage transformers.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A DC/DC converter, comprising:
substantially similar first and second transformers including an integrated magnetic core having first and second gapped legs and first and second ungapped legs to provide independent first and second transformers and first and second energy storage inductors,
the first transformer including first and second primary windings and first and second secondary windings with a first primary/secondary winding pair and second primary/secondary winding pair; and
the second transformer including first and second primary windings and first and second secondary windings with a first primary/secondary winding pair and a second primary/secondary winding pair;
wherein the converter provides a first voltage level in a first configuration having the first and second secondary windings of the first and second transformers coupled in parallel and provides a second voltage level substantially twice the first voltage level in a second configuration having the first and second secondary windings of the first and second transformers coupled in series.

2. The converter according to claim 1, wherein a first circuit includes the second secondary winding of the first transformer and the first secondary winding of the second transformer and a second circuit includes the first secondary winding of the first transformer and the second secondary winding of the second transformer.

3. The converter according to claim 2, wherein the first circuit includes first and second diodes coupled cathode-to-cathode at a connection point and a first capacitor having a first end coupled to a point between the second secondary winding of the first transformer and the first secondary winding of the second transformer and a second end coupled to the connection point, wherein the connection point is provided in the first configuration and not the second configuration.

4. The converter according to claim 3, wherein the second circuit includes third and fourth diodes coupled cathode-to-cathode at a Vout+ terminal and a second capacitor having a first end coupled to a point between the first secondary winding of the first transformer and the second secondary winding of the second transformer and a second end coupled to the connection point, wherein a Vout− terminal is provided by the first end of the first capacitor.

5. The converter according to claim 4, wherein the first and second configurations differ by first and second connections added and the connection point connecting the first and second capacitors removed.

6. The converter according to claim 5, wherein the first connection connects the Vout+ terminal and the connection point.

7. The converter according to claim 6, wherein the second connection connects the Vout− terminal with the second end of the second capacitor.

8. The converter according to claim 1, wherein a ratio of the first voltage level to the second voltage level is two.

9. The converter according to claim 1, wherein the first voltage level ranges from about 42V to about 56V and the second voltage level ranges from about 21V to about 28V.

10. A method, comprising:
providing first and second substantially similar transformers including an integrated magnetic core having first and second gapped legs and first and second ungapped legs to provide independent first and second transformers and first and second energy storage inductors,
the first transformer including first and second primary winding/secondary winding pairs;
the second transformer including first and second primary winding/secondary winding pairs;
wherein the converter provides a first voltage level in a first configuration utilizing parallel-connected transformer secondary windings and provides a second voltage level substantially twice the value of the first voltage level, in a second configuration utilizing series connected transformer secondary windings.

11. The method according to claim 10, wherein a first circuit includes a second secondary winding of the first transformer and a first secondary winding of the second transformer and a second circuit includes a first secondary winding of the first transformer and a second secondary winding of the second transformer.

12. The method according to claim 11, wherein the first circuit includes first and second diodes coupled cathode-to-cathode at a connection point and a first capacitor having a first end coupled to a point between the second secondary winding of the first transformer and the first secondary winding of the second transformer and a second end coupled to the connection point, wherein the connection point is provided in the first configuration and not the second configuration.

13. The method according to claim 12, wherein the second circuit includes third and fourth diodes coupled cathode-to-cathode at a Vout+ terminal and a second capacitor having a first end coupled to a point between the first secondary winding of the first transformer and the second secondary winding of the second transformer and a second end coupled to the connection point, wherein a Vout− terminal is provided by the first end of the first capacitor.

14. The method according to claim 13, wherein the first and second configurations differ by first and second connections added and the connection point connecting the first and second capacitors removed.

15. The method according to claim 14, wherein the first connection connects the Vout+ terminal and the connection point.

16. The method according to claim 15, wherein the second connection connects the Vout− terminal with the second end of the second capacitor.

17. A DC/DC converter, comprising:
- a first primary winding having first and second secondary windings and a second primary winding having first and second secondary windings;
- a first circuit having
  - a first circuit outer circuit loop including a first secondary winding of the second primary winding, a first diode, a second diode, and a second secondary winding of the first primary winding;
  - a first circuit first inner circuit loop including a first capacitor, the second secondary winding of the first primary winding, and the first diode;
  - a first circuit second inner loop including the first capacitor, the first secondary winding of the second primary winding, and the second diode;
- a second circuit coupled to the first circuit, the second circuit having
  - a second circuit outer circuit loop including a first secondary winding of the first primary winding, a third diode, a fourth diode, and a second secondary winding of the second primary winding;
  - a second circuit first inner circuit loop including a second capacitor, the first secondary winding of the first primary winding, and the third diode;
  - a second circuit second inner loop including the second capacitor, the second secondary winding of the second primary winding, and the fourth diode;
  - a Vout+ terminal located between the third and fourth diodes;
  - a Vout− terminal located between the secondary winding of the first primary winding and the first secondary winding of the second primary winding;
- wherein the circuit includes a first configuration to provide a first output voltage level and a second configuration to provide a second output voltage level,
- the first configuration including a first configuration electrical connection to couple the first and second capacitors end-to-end from the Vout+ terminal to the Vout− terminal;
- the second configuration including:
  - a first electrical connection for the second configuration from the Vout+ terminal to a point between the first and second diodes;
  - a second electrical connection for the second configuration from the Vout− terminal to a node coupled to the second capacitor, the first secondary winding of the first primary winding, and the second secondary winding of the second primary winding,
- wherein the first configuration electrical connection is removed.

* * * * *